United States Patent [19]

Lee

[11] 4,379,312

[45] Apr. 5, 1983

[54] CONTROL SYSTEM FOR AUDIO-VISUAL PROJECTOR

[75] Inventor: Michael G. Lee, Redmond, Wash.

[73] Assignee: Indal Corp., Bellevue, Wash.

[21] Appl. No.: 224,082

[22] Filed: Jan. 12, 1981

[51] Int. Cl.³ ............................................. G11B 31/00
[52] U.S. Cl. ........................................ 360/80; 353/15
[58] Field of Search ............... 360/80; 353/15; 352/17

[56] References Cited

U.S. PATENT DOCUMENTS

| | | | |
|---|---|---|---|
| 3,881,185 | 4/1975 | Broline | 353/15 |
| 3,979,774 | 9/1976 | Chen et al. | 360/80 |
| 3,995,315 | 11/1976 | Miller | 360/80 |
| 4,027,958 | 6/1977 | Shigeta et al. | 353/15 |
| 4,072,989 | 2/1978 | Grant | 360/80 |
| 4,075,668 | 2/1978 | Keach | 360/80 |
| 4,115,824 | 9/1978 | Mindell | 369/80 |
| 4,165,159 | 8/1979 | Landau et al. | 360/80 |
| 4,183,632 | 1/1980 | Nutting et al. | 352/17 |

*Primary Examiner*—Alfred H. Eddleman

*Attorney, Agent, or Firm*—Seed, Berry, Vernon & Baynham

[57] ABSTRACT

A system for the control and synchronization of magnetic tape and filmstrip in an audio-visual projector. Film is advanced by means of recorded advance tones on the magnetic tape which are detected by a tone detector to generate an advance pulse. An advance counter is incremented responsive to each advance pulse and decremented as the film advances each frame. The output of the advance counter actuates a film-advance mechanism unless the contents of the counter are zero, so that synchronization is maintained even if the rate at which the advance pulses occur exceeds the operating speed of the film-advance mechanism. Means are provided to automatically synchronize the tape and film at predetermined locations by optically sensing markers affixed to the tape and film. The system may also advance the tape independently of the film in either a fast-forward or a regular-speed mode or it may advance the film independently of the tape.

9 Claims, 5 Drawing Figures

CONTROL SYSTEM FOR AUDIO-VISUAL PROJECTOR

DESCRIPTION

Technical Field

This invention relates to audio-visual projectors, and more particularly, to a system for assuring synchronization of audio and visual media, and for providing ease of access to particular media segments.

Background Art

Audio-visual projectors which provide an integrated audio-visual program have become increasingly popular in industry as sales and instructional aids, and in schools as teaching aids. Such systems have had a number of shortcomings which have restricted their usefulness by technically unskilled operators. Present systems typically use single-frequency tone bursts on a magnetic tape control track to generate a pulse which advances the filmstrip to the next frame to be viewed. Difficulties are often experienced in maintaining synchronization between the visual and audio media when the advance tones occur at a rate which is too rapid for the film-advance mechanism to follow since the film-advance mechanism requires a relatively long period to cycle. A loss of synchronization will continue through an entire program unless the operator recognizes and manually intervenes to correct the problem. Achieving synchronization of the media during the program may be difficult if the correlation between the sound program and the frame being viewed is not immediately apparent to the operator. Rapid location of a particular frame within the filmstrip requires continuous attention to the machine, and the subsequent resynchronization of the magnetic tape with the filmstrip frame may be a formidable task.

Disclosure of the Invention

The primary object of the invention is to provide a reliable means of assuring continued synchronization of the audio and visual media displayed in an audio-visual filmstrip projector even where advance tones on an audio control track occur at a rapid rate.

It is another object of the invention to provide a means of automatically moving the audio and visual media to predetermined corresponding locations in order to establish synchronization of the audio and visual media.

It is still another object of the invention to provide an audio-visual projector in which either the audio media or the visual media may be moved independently of each other.

It is a further object of the invention to provide a relatively inexpensive audio-visual device which nevertheless includes a variety of operating modes.

These and other objects of the invention are provided by a control system for an audio-visual device which sequentially projects frames of a filmstrip in synchronism with an audio program recorded on a magnetic tape. Spaced-apart, coded signals are recorded on either the audio program or a separate control track of the tape at the start of each portion of the audio program associated with a frame of the filmstrip. The control system includes a tone detector for generating an advance pulse responsive to receipt of each coded signal. Each advance pulse increments an advance counter, and the advance counter actuates a film-advance mechanism which advances the filmstrip whenever the contents of the advance counter are not equal to a predetermined number, such as zero. After the filmstrip has advanced each frame, an advance-complete pulse is generated which decrements the film-advance counter. Consequently, advance pulses produced at a rate faster than that which the film-advance mechanism is able to respond cause the counter to increment above the predetermined number and remain there until the filmstrip has been advanced a sufficient number of frames to equal the number of advance pulses and hence decrement the advance counter back to the predetermined number. The system also includes a film-marker detector for generating a film-stop signal responsive to detecting an optical marker applied to a predetermined frame of the filmstrip. A similar tape-marker detector generates a tape-stop signal responsive to detecting an optical marker applied to a corresponding portion of the tape. A manually selectable synchronization mode causes the film to be advanced frame-by-frame until the film-stop signal is detected and the tape to move until the tape-stop signal is detected in order to synchronize the filmstrip and tape at a predetermined location. The audio program on the tape is preferably muted while the tape is moving in the synchronization mode. The control system is also capable of advancing either the tape or the filmstrip independently of the other in order to allow manual synchronization of the tape and filmstrip. The operation of the audio-visual device automatically terminates when a second coded signal on the tape is detected, thereby terminating movement of the tape, which prevents additional film-advance pulses from being generated. At the same time, an indicating lamp is illuminated to provide visual feedback of the state of the tape-drive mechanism.

BEST MODE FOR CARRYING OUT THE INVENTION

Figure 1:
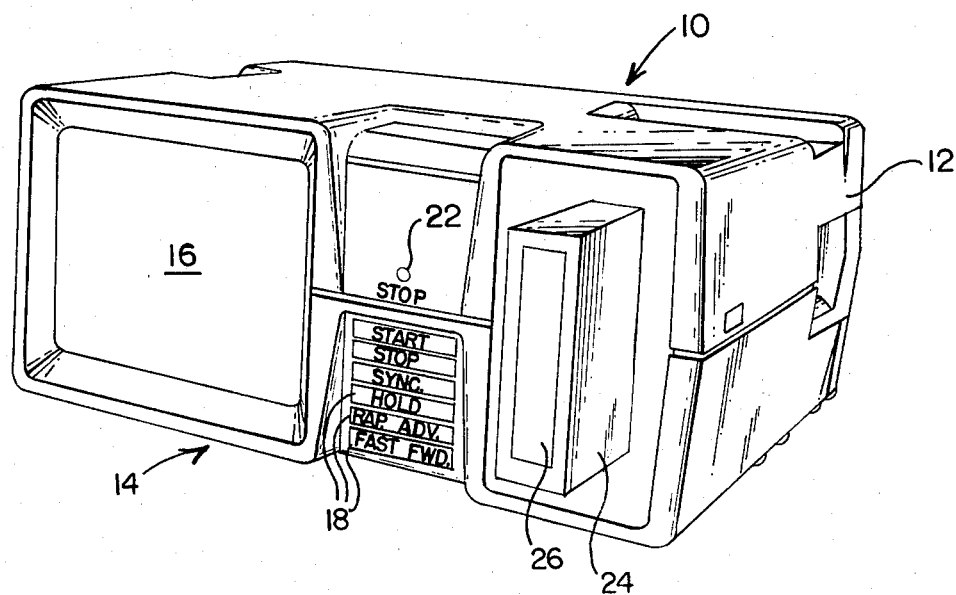
FIG. 1 is an isometric view of an audio-visual projector of the type utilizing the control system.

The control system is adapted for use with an audio-visual projector of the type illustrated in FIG. 1. The projector 10 is housed in a case 12 having a front panel 14 containing a projection screen 16, a keyboard 18, a "STOP" indicator light 22, and a slot 24 for receiving a conventional audio-visual cassette 26. As explained in greater detail hereinafter, the keyboard 18 contains several function keys for controlling the operation of the projector 10. The STOP indicator light 22 indicates that the tape in cassette 26 is not moving.

Figure 2:
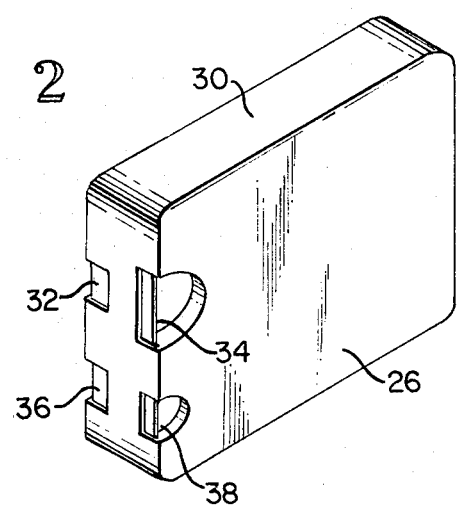
FIG. 2 is an isometric view of an audio-visual cartridge used with the projector of FIG. 1

The audio-visual cassette 26, as illustrated in FIG. 2, includes a box-like housing 30 having a continuous length of filmstrip on one side and a continuous length of magnetic recording tape on the other. An opening 32 is provided for projecting light through the film to form an image of each frame on the screen 16 (FIG. 1). A second opening 34, positioned on the tape side of the container 30, is adapted to receive a tape capstan which rotates and is pressed against the tape by a pressure roller in the audio-visual device 10 in order to advance the tape at a constant speed. The audio-visual cassette 26, as described so far, is conventional and commonly used in audio-visual devices such as illustrated in FIG. 1. However, the audio-visual cartridge 26 used with the inventive control system utilize a modified housing 30 having a first opening 36 through which an optical marker affixed to the film may be viewed by a conventional optical sensor (shown hereinafter) mounted in the audio-visual projector 10. A similar opening 38 on the tape side of the housing 30 allows a tape optical sensor to view an optical marker affixed to the tape. The optical markers are affixed to the film and tape at locations such that when both optical markers are visible in their respective windows 36,38, the tape and filmstrip are synchronized to each other.

Figure 3:
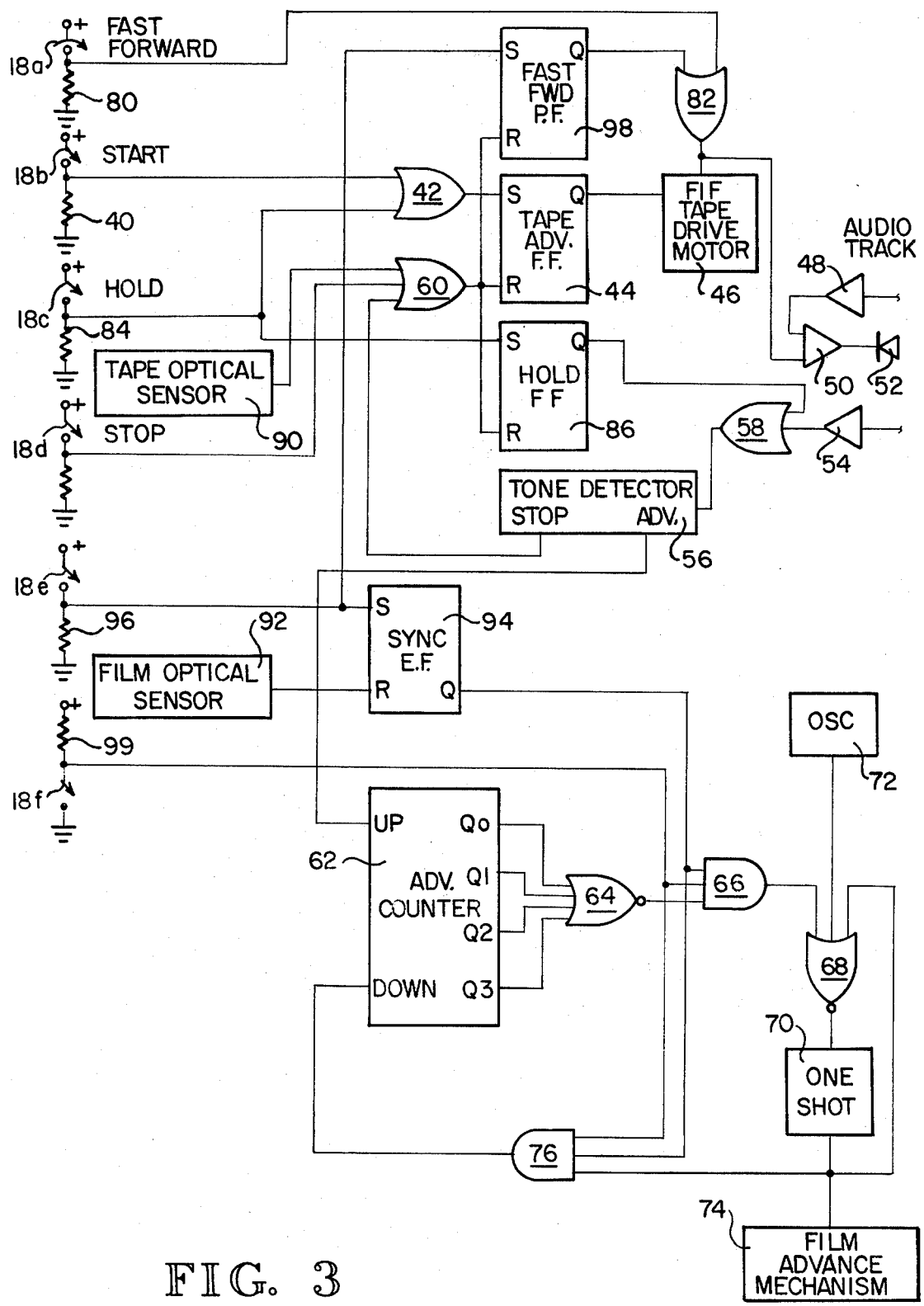
FIG. 3 is a schematic of one embodiment of the control system for the audio-visual projector of FIG. 1.

One embodiment of the control system for the audio-visual projector is illustrated in FIG. 3. The operation of the system is controlled by several function keys 18a-f of the keyboard 18 which actuate various flip-flops or, gates, as explained hereinafter. Operation initially commences by closing the "START" switch 18b, thereby applying a high across resistor 40, which is coupled through OR-gate 42 to set a tape-advance flip-flop 44. Flip-flop 44 then generates an output which is applied to the regular-speed input of a tape-drive motor 46 to cause the audio tape to move past conventional audio playback heads in the projector 10 and present the audio program. The output of the playback head is applied to an audio preamplifier 48 which generates a relatively high-level signal that is, in turn, further boosted by a conventional power amplifier 50 having a mute input. The power amplifier 50 drives a conventional loudspeaker 52.

The tape also contains a control track which moves past a second playback head. This second playback head is connected to a second preamplifier 54, which is applied to a conventional tone detector 56 when OR-gate 58 is enabled. Assuming for the moment that OR-gate 58 is, in fact, enabled, the tone detector 56 detects tones of one frequency and generates an advance pulse from its advance output in response thereto. The tone detector 56 also detects control tones of a different frequency and generates stop pulses from its stop output in response thereto. The stop pulses reset the tape-advance flip-flop 44 through OR-gate 60, thereby de-energizing the tape-drive motor 46. The flip-flop 44 may also be reset through OR-gate 60 by closing the STOP-function switch 18d.

The advance pulses from the tone detector 56 are applied to the increment input of an advance counter 62 which is a conventional up/down counter having a multi-bit binary output. Counter 62 thus increments once for each advance pulse, regardless of the rate at which the advance pulses are produced. A NOR-gate 64, receiving the output of the advance counter 62, decodes a "0000" output from the counter 62 so that it generates a low whenever the contents of counter 62 are not zero. The low is applied to AND-gate 66, which applies a low to NOR-gate 68. NOR-gate 68 also receives the normally low output of one-shot 70 and the output of an oscillator 72 so that when the output of AND-gate 66 is low, pulses from the oscillator 72 are applied to one-shot 70. One-shot 70 then generates a pulse which triggers a film-advance mechanism 74 in order to advance the filmstrip one frame. The pulse generated by one-shot 70 disables NOR-gate 68 so that the one-shot 70 cannot be triggered by additional pulses from oscillator 72 while the output of one-shot 70 remains high. The duration of the pulse from one-shot 70 is longer than the cycle time of the film-advance mechanism 74 so that the one-shot 70 does not attempt to advance the film an additional frame until the film-advance cycle has been completed.

The positive-going pulse at the output of one-shot 70 is also coupled through enabled AND-gate 76 to the decrement input of the advance counter 62. Counter 62 thus decrements once for each frame of the filmstrip that is advanced by the film-advance mechanism 74. The contents of the advance counter 62 are thus a measure of the number of advance pulses to which the film-advance mechanism 74 has not yet responded.

In operation, the tape-drive flip-flop 34 is set by closing the START-function switch 18b. Advance pulses are generated by the tone detector 56 as coded signals on the tape are applied to the preamplifier 54. The advance pulses then increment the counter 62, causing the output of NOR-gate 64 to go low. AND-gate 66 then enables the output of oscillator 72 to be coupled through NOR-gate 68 to trigger the one-shot 70 and actuate the film-advance mechanism 74 and decrement the advance counter 62. While the advance pulses from the tone detector 74 could be applied directly to the one-shot 70, the rate at which the advance pulses occur is often much faster than the rate to which the film-advance mechanism 74 is able to respond. If, for example, five advance pulses occurred within two seconds and the cycle time of the film-advance mechanism was one second, the filmstrip and tape would be out of synchronism by three frames.

The control system may also be operated in a variety of modes in addition to the normal playback mode initiated by closing the START-function switch 18b. The tape may be wound forwardly at a fast rate without advancing the filmstrip by closing the fast-forward switch 18a, thereby applying a high across resistor 80. The high is coupled through OR-gate 82 to the fast-forward input of tape-drive motor 46 to cause the tape to move at a relatively high speed. The high at the output of OR-gate 82 is also applied to the mute input of power amplifier 50 so that the program on the audio track is not broadcast by the speaker 52. Although the coded signals on the control track are applied to the tone detector 56 through the preamplifier 54 and OR-gate 58, the frequency of the signals, by virtue of the higher tape speed, is not recognized by the tone detector 56 as either advance signals or STOP signals.

The tape may also be played in its normal mode without advancing the filmstrip by closing the HOLD-function switch 18c, thereby applying a high across resistor 84. The high sets the tape-advance flip-flop 44 through NOR-gate 42 in order to energize the drive motor 46. The high across resistor 84 also sets HOLD flip-flop 86, which then generates a high that disables OR-gate 58 to prevent the tone detector 56 from generating film-advance pulses. The HOLD flip-flop 86 is reset whenever the tape-advance flip-flop 44 is reset. The HOLD mode may be used to either listen to the audio program without also viewing the visual program or to manually synchronize the tape and filmstrip when the tape has lagged behind the filmstrip.

An important feature of the control system is the ability to automatically synchronize the tape and filmstrip at a predetermined location. As mentioned above, an optical marker is applied to one frame of the filmstrip and at a predetermined location on the tape corresponding to the marked frame. A conventional optical sensor 90 mounted adjacent the tape detects the marker on the tape and resets the tape-advance flip-flop 44 through OR-gate 60. A similar optical sensor 92 positioned adjacent the filmstrip detects the filmstrip optical marker and resets a sync flip-flop 94. The synchronization mode is selected by closing the sync switch 18e, thereby applying a high across resistor 96. The high across resistor 96 sets the sync flip-flop 94 and a fast-forward flip-flop 98. The fast-forward flip-flop 98 then generates a high which energizes the tape-drive motor 46 and mutes the power amplifier 50 through OR-gate 82. The tape then advances at a rapid speed without generating an audible sound until the optical marker on the tape is detected by the tape optical sensor 90, at which time the tape-advance flip-flop 44 and fast-forward flip-flop 96 are reset through OR-gate 60. Similarly, the sync flip-flop 94 generates a low which enables NOR-gate 68 through AND-gate 56 so that the output of oscillator 72 triggers one-shot 70 after each pulse from the one-shot 70. At the same time, the low at the output of sync flip-flop 94 disables AND-gate 76 to prevent the pulses at the output of one-shot 70 from decrementing the advance counter 62 so that the contents of the advance counter remain at zero. When the optical marker on the filmstrip is detected by the film optical sensor 92, the sync flip-flop 94 is reset, thereby disabling NOR-gate 68 through AND-gate 56. At this time, the filmstrip and tape are synchronized to each other, preferably at the start of an audio-visual program.

As mentioned above, the audio program can be presented independently of the visual program by closing the HOLD switch 18c. Similarly, the filmstrip can be advanced independently of the tape by closing the rapid-advance function switch 18f, thereby applying a low across resistor 89. The low enables NOR-gate 68 so that one-shot 70 is repetitively triggered by oscillator 72 in order to repetitively trigger the film-advance mechanism 74. At the same time, the low across resistor 99 disables AND-gate 76 so that the pulses from the one-shot 70 do not decrement the counter 62, which thus remains at zero.

Figure 4:
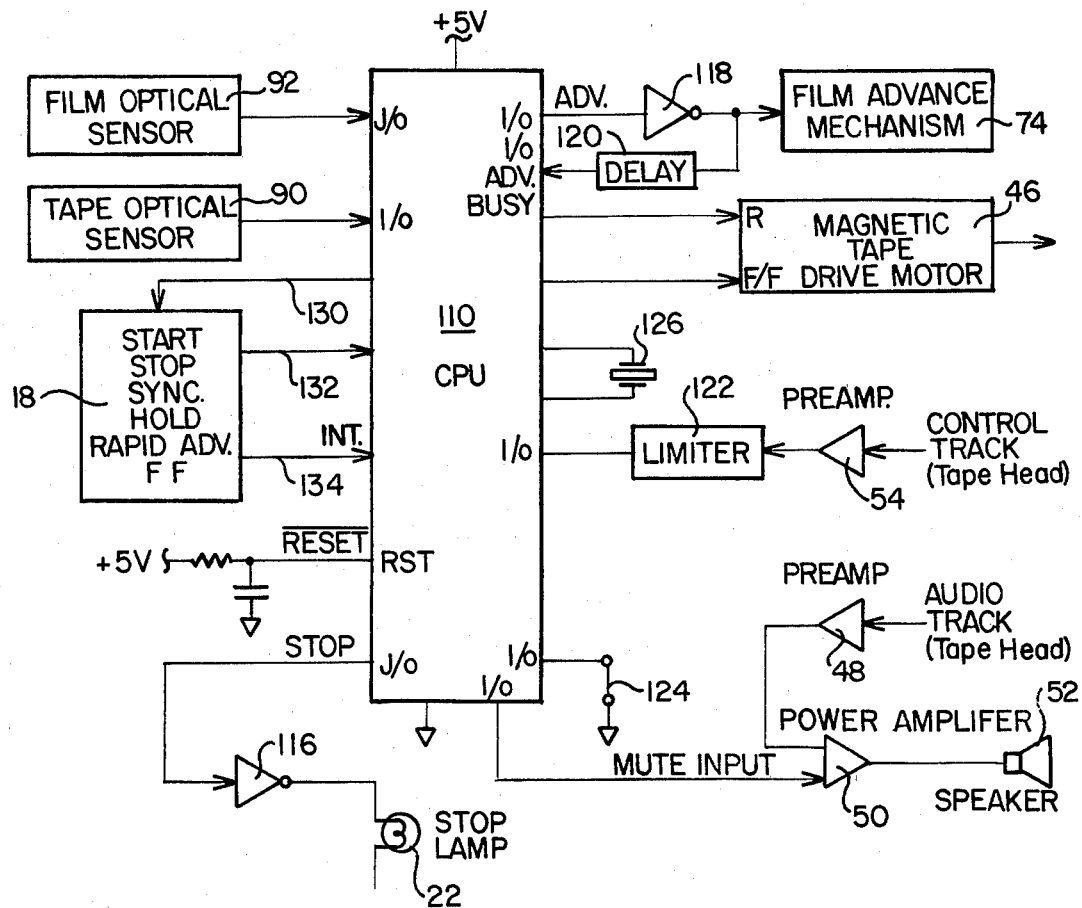
FIG. 4 is a schematic of another embodiment of the control system for the audio-visual projector of FIG. 1.

Another embodiment of the control system for an audio-visual projector is illustrated in FIG. 4. The embodiment of FIG. 4 utilizes a central processing unit 110 which operates in accordance with a stored program of instructions, as explained hereinafter. The embodiment of FIG. 4 utilizes a large number of the same components as the embodiment of FIG. 3, which are identically numbered. These components include the tape optical sensor 90, the film optical sensor 92, the keyboard 18, STOP lamp 22, film-advance mechanism 74, magnetic tape drive motor 46, control track preamp 54, audio track preamp 48, power amplifier 50, and speaker 52.

The central processing unit may be a commercially available microprocessor, such as an Intell 8021. When power is initially applied to the system, the reset input to the processing unit 110, which is normally held high through resistor 112, is pulled low by capacitor 114 to reset the processing unit 110. The processing unit 110 then executes an internal initialization program and, when completed, starts executing a program which has been written into a non-volatile, read-only memory in the processing unit 110.

The processing unit interfaces with the film optical sensor 92, tape optical sensor 90, STOP lamp 22 (driven through inverter 116), film-advance mechanism 74 (through inverter 118), a delay circuit 120, a limiter circuit 122, and a control wire 124 through input/output ports. A conventional oscillator crystal 126 controls the operating frequency of the processing unit 110. The delay circuit 120 may be a conventional one-shot which, when triggered, generates an output having a duration which is longer than the cycle time of the film-advance mechanism 74. The delay circuit 120 thus informs the processing unit 110 that sufficient time has elapsed for the film to be advanced one frame so that the processing unit 110 can then advance the filmstrip an additional frame.

The control wire 124 is provided to alter the operation of the processing unit 110 in accordance with the stored program. During execution of the program, the processing unit 110 tests for the presence of the wire 124 so that an audio-visual projector which is not adapted to handle magnetic tape will recognize that fact and not execute those portions of the program which control a magnetic-tape handling system.

The keyboard 18 interfaces with the processing unit 110 in a slightly different manner from the other components. Keyboard entries are detected by the processing unit 10 through execution of a stored program which applies a logic level to each of the keys 18a–f one at a time through bus 130 while testing all of the keys through lead 132. In this manner, each of the keys is tested and the selected key detected. The function of the selected key is interpreted by the stored program of instructions in the processing unit 110 to cause the program to jump to a predetermined subroutine, as explained in greater detail hereinafter. A further feature of the preferred embodiment is the use of an interrupt input to the processing unit 110 which allows the operator to interrupt the normal execution of the stored program by closing the STOP switch 18d (FIG. 3) of the keyboard 18, which applies an appropriate logic signal to the interrupt input of the processing unit 110 through line 134.

Figure 5:
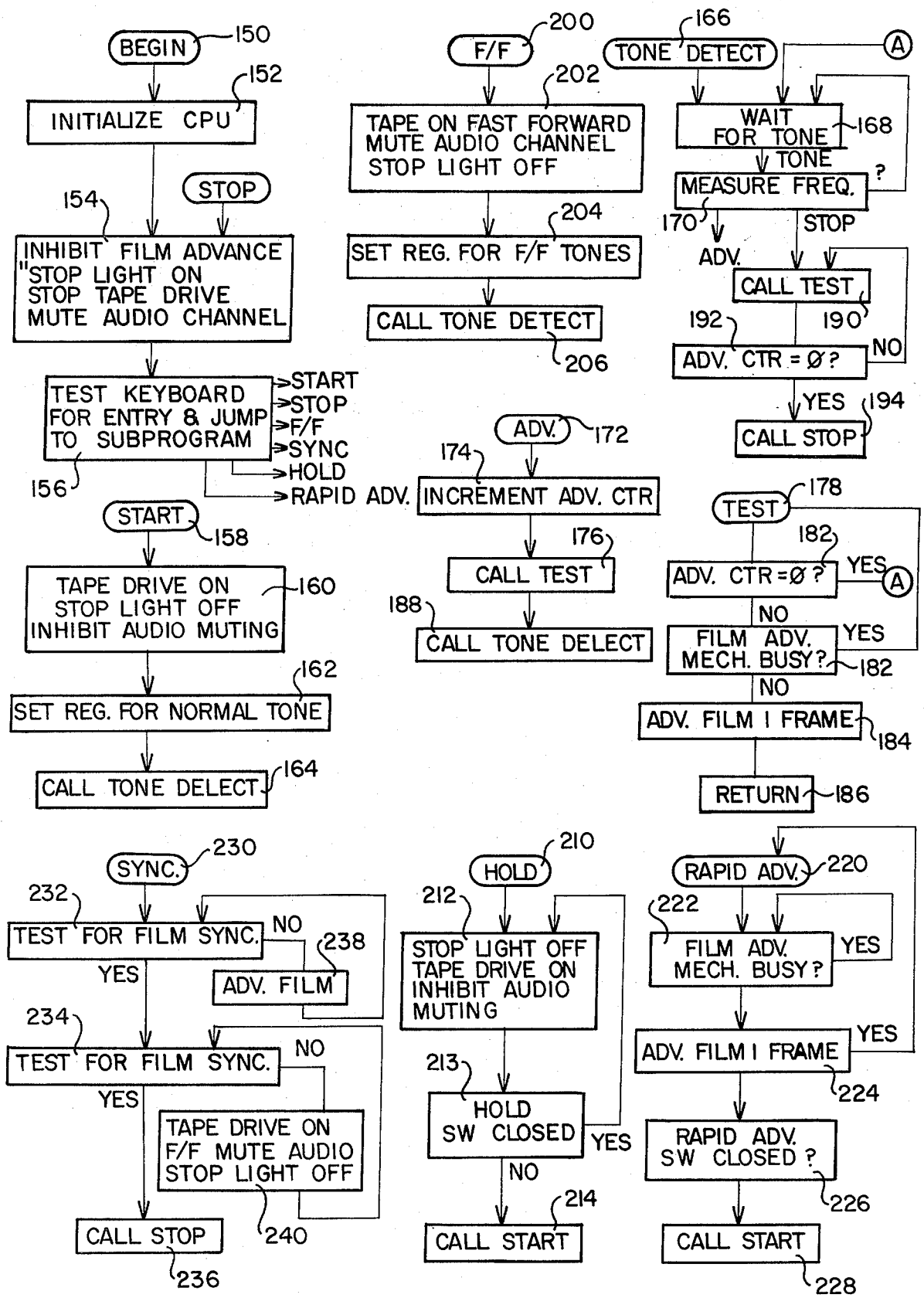
FIG. 5 is a flow chart of a program of instruction instructions utilized by a central processing unit module in the embodiment of FIG. 4.

A flow chart by which one skilled in the art can easily and quickly generate a program of instructions for any processing unit 110 is illustrated in FIG. 5. When power is initially applied to the system, causing the reset input to the processing unit 110 to go low, execution of the program starts at 150. The processing unit 110 is initialized at 152 through an internal program. The stored program is then executed starting at 154, where the generation of advance pulses through driver 118 is inhibited, STOP light 22 is energized through driver 116, the tape-drive motor 46 is de-energized, and the power amplifier 50 is muted. The program then remains in a loop at 156 while it tests the keyboard 18 for the closing of a switch corresponding to a selected function.

Assuming that the START switch 18b is closed, the program jumps to a START subroutine at 158, which causes the processing unit 110 to energize the tape-drive motor, de-energize the STOP lamp 22 through driver 116, and inhibit the muting of the power amplifier 50 at 160. An internal register is then set at 162 to detect the frequency of the control-track signals through preamplifier 54 and limiter 122. Basically, the processing unit 110 determines the frequency of the control signals by counting the number of zero crossings occurring in a given time period as determined by the oscillation frequency of the crystal 126. The number of zero crossings is thus a measure of the frequency of the control tone. The system utilizes control tones having two discrete frequencies. A control tone commanding an advance of the filmstrip one frame has a frequency of between 40-600 Hz. A control tone commanding the tape motion to stop has a frequency of between 2500-5000 Hz. After the register has been set at 166 to detect the frequency of the control tones, a tone-detect subroutine is called at 164. The tone-detect subroutine is entered at 166, and the processing unit 110 waits for a control tone at 168. When the tone occurs, its frequency is measured at 170. If the control tone indicates an advance, an advance subroutine is called and entered at 172. An internal advance counter is then incremented at 174, and a test subroutine is called at 176. The program then proceeds through 178 to 180, where the zero count of the advance counter is tested. If the advance counter is not zero, the program tests at 182 to determine if the film-advance mechanism 74 is busy. If the advance mechanism 74 is not busy, an advance pulse is produced from the appropriate I/O port at 184, which actuates the film-advance mechanism 74 through driver 118. The program then returns via 186 to the advance subroutine, where a tone-detect subroutine is called 188.

If the program determines at 180 that the advance counter is equal to zero, indicating that all advance commands have been satisfied, the program branches back to 168, where it waits for an additional tone which normally occurs when the audio program reaches a portion corresponding to the next frame of the filmstrip. If the program determines at 180 that the advance counter is not zero and determines at 182 that the advance mechanism is busy, the program returns to 178 and remains in that loop until the film-advance mechanism is no longer busy.

If the control signal is found at 170 to command a stop, the test subroutine is called at 190, where the program will remain until the film-advance mechanism 74 is able to advance the film one frame at 184 and then return via 186 to 192, where the status of the advance counter is examined. If the advance counter is still not zero, thus indicating that more advance commands have been generated than the advance mechanism 74 has yet processed, the test subroutine is once again called at 190, thereby causing the film to be advanced another frame. When the advance counter is finally found at 192 to equal zero, the STOP subroutine is called at 194, thereby causing the program to inhibit the film-advance mechanism 74, energize the STOP lamp 22, de-energize the tape-drive motor 46, mute the power amplifier 50, and wait at 156 for the closing of another function switch.

If the fast-forward switch 18a of the keyboard 18 is closed, the program enters a fast-forward subroutine through 200, where, at 202, it causes the processing unit 110 to energize the fast-forward input of the driver motor 46, mute the power amplifier 50 so that the raised frequency audio program is not heard, and de-energize the STOP lamp 22. The internal register is then set at 204 to recognize advance pulses and STOP tones which will now occur at a substantially higher frequency, and the tone-detect subroutine, which is entered at 166, is called at 206. The program then waits for a tone at 168, measures its frequency at 170, and processes advance or STOP commands in the same manner as explained above. However, because of the substantially faster speed of the tape and the consequential greater rate at which advance pulses are detected, it is likely that the film-advance mechanism 74 will not be able to function as fast as the advance commands are detected. The advantage of the advance counter is thus even more critical when the audio-visual projector 10 is operating in the fast-forward mode.

As explained above with reference to the first embodiment of FIG. 3, either the tape or the filmstrip may be advanced independently of the other. The tape is advanced independently of the filmstrip by closing the switch 18c for the HOLD mode, which causes the program to jump to a HOLD subroutine at 210. The program, at 212, then de-energizes the STOP lamp 22, energizes the tape-drive motor 46 at its regular speed, and inhibits muting of the power amplifier 50 so that the audio program can be heard. If the HOLD switch 18c is still found to be closed at 214, the program remains in the HOLD subroutine. When the program finally determines at 212 that the HOLD switch 18c has been opened, the program calls the START subroutine at 214. The HOLD mode is used primarily to manually synchronize the tape and the filmstrip when the tape lags the filmstrip. Consequently, the HOLD switch is closed until the audio program corresponds to the frame being displayed on the screen 16. The HOLD switch 18c is then opened and the projector 10 automatically resumes presenting the audio and visual program in proper sequence.

As mentioned above, the filmstrip can also be advanced independently of the tape by closing the rapid-advance switch 18f, thereby causing the program to jump to a rapid-advance subroutine through 220. In the rapid-advance subroutine, the program remains at 222 until the film-advance mechanism 74 is no longer busy, at which time the film-advance mechanism 74 is energized at 224. If the rapid-advance switch is still found to be closed at 226, the program remains in the rapid-advance subroutine. Otherwise, the START subroutine is called at 228.

As emphasized above in connection with the embodiment of FIG. 3, an important feature of the audio-visual projector is the ability to automatically synchronize the filmstrip and tape at a predetermined location. Accordingly, a SYNC mode is selected by closing the SYNC switch 18c, thereby causing the program to jump from 56 to a SYNC subroutine at 230. The program then checks at 232 to see if the film optical marker is being detected by the film optical sensor 92. If so, the program checks at 234 to determine if the tape optical marker is being detected by the tape optical sensor 90. If so, both tapes are synchronized at the same location and the STOP subroutine is called through 236. If the film optical marker is not yet being detected by the film optical sensor 92, the program branches through 238, where the film is advanced one frame until the marker is detected by the sensor 92. If the tape optical marker is not yet being detected by the tape optical sensor 90, the program branches to 240, where the tape-drive motor 46 is energized in its fast-forward mode, the power amplifier 50 is muted, and the STOP light 22 is de-energized. When the tape optical marker reaches the tape optical sensor 90, the program branches out of 234 to the STOP subroutine via 236.

The control system for the audio-visual projector is thus relatively inexpensive and simple, while capable of operating in a large number of modes and maintaining synchronism between the tape and filmstrip even when the rate at which the film-advance commands occur exceeds the response time of the film-advance mechanism. Additionally, the control system is capable of automatically synchronizing the tape and filmstrip to a predetermined location.

I claim:

1. A control system for an audio-visual device for sequentially projecting a plurality of frames of a filmstrip and for presenting an audio program recorded on an audio tape including spaced-apart coded signals located at the start of each portion of each audio program associated with a frame of said filmstrip, said control system comprising:

first tone-detector means detecting said coded signals for generating an advance pulse responsive thereto;

a film-advance mechanism for advancing said filmstrip responsive to an advance-actuating signal;

film-advance feedback means for generating an advance-complete pulse after said filmstrip has advanced each frame; and advance-counter means incremented by each of said advance pulses and decremented by each of said advance-complete pulses, said counter means generating said advance-actuating signal when the contents of said counter means do not correspond to a predetermined number, whereby advance pulses occurring at a rate faster than the cycle time of said advance mechanism are recorded by said counter means until said advance mechanism is able to respond thereto.

2. The control system of claim 1, further including means for synchronizing said filmstrip and tape, comprising:

film-marker detection means for generating a film-stop signal responsive to detecting a marker applied to a frame of said filmstrip;

tape-marker detection means for generating a tape-stop signal responsive to detecting a marker applied to a portion of said tape;

tape-drive means for advancing said tape responsive to a tape-advance signal; and manually actuatable synchronizer means for generating said advance-actuating signal until said film-stop signal is detected and for generating said tape-advance signal until said tape-stop signal is detected, whereby said filmstrip and tape are automatically synchronized at a predetermined location.

3. The control system of claim 2, further including means for muting the audio program on said tape while said tape is moving responsive to actuation of said synchronizer means.

4. The system of claim 1, further including manually actuatable means for generating said tape-advance signal while preventing said film-advance mechanism from responding to the coded signals on said audio program, thereby presenting said audio program while maintaining said filmstrip stationary in order to allow manual synchronization of said tape and filmstrip.

5. The control system of claim 1 wherein said audio program further includes a second coded signal, located at the end of a portion of said audio program associated with a frame of said filmstrip, and wherein said system further includes second tone detector means for detecting said second coded signal and for generating a STOP pulse in response thereto, said stop pulse terminating movement of said tape to prevent said first tone-detector means from generating advance pulses, thereby preventing said filmstrip from being advanced.

6. The control system of claim 1 wherein said film-advance feedback means includes delay means for generating said advance-complete pulse subsequent to the start of each advance-actuating signal by an interval which is longer than the cycle time of said film-advance mechanism.

7. The control system of claim 1, further including an indicating lamp and means for illuminating said lamp when said tape is stationary.

8. The control system of claim 1, further including means for moving said tape at a relatively fast speed and means for altering said first tone-detector means to recognize the increased frequency of said coded signals so that said filmstrip may remain in synchronism with said tape.

9. The control system of claim 8 wherein said first detector means counts the number of zero crossings of said control signal within a predetermined period and said control system alters the relationship between the number of zero crossings and the time interval in which said crossings are measured responsive to relatively fast movement of said tape.

* * * * *